United States Patent Office 3,500,234
Patented Mar. 10, 1970

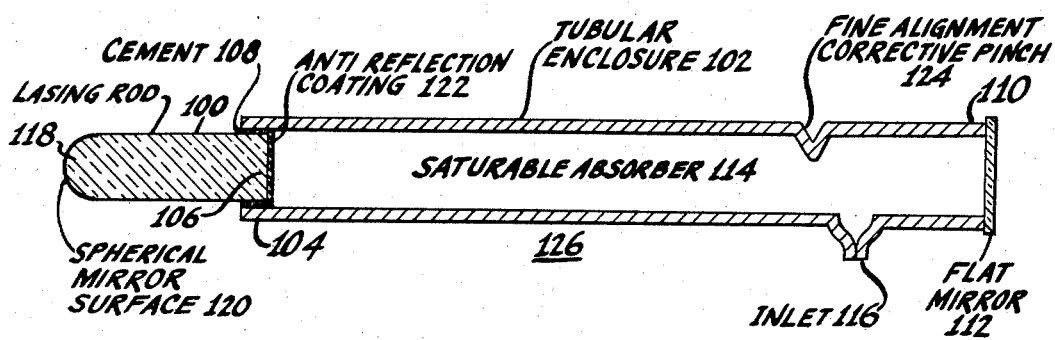

3,500,234
UNITARY Q-SWITCH LASER DEVICE
Peter V. Goedertier, Princeton, N.J., assignor to RCA Corporation, a corporation of Delaware
Filed July 7, 1966, Ser. No. 563,486
Int. Cl. H01s 3/00
U.S. Cl. 331—94.5       3 Claims

ABSTRACT OF THE DISCLOSURE

The entire laser, with the exception of the pumping means, is made in the form of a single unitary structure having only one interface between materials of different indices of refraction. This makes for a more accurate, efficient laser; in addition to providing mechanical stability without a heavy base and providing complete prealignment of the laser.

---

This invention relates to a pulse operated Q-switch laser device and, more particularly, to such a device which, except for a source of pumping light, comprises in its entirety a single unitary structure.

The term "optical" as used herein, includes not only the visible electromagnetic spectrum, but the infrared and ultraviolet spectra as well.

As is well known in the art, a laser is a device for producing coherent radiation by stimulated emission at a predetermined frequency in the optical spectrum which depends upon the particular lasing material employed in the laser. Briefly, this is accomplished by locating the lasing material between a first reflective surface in cooperative relationship with a first end thereof and a second reflective surface in cooperative relationship with a second end thereof to define a resonant cavity at the predetermined frequency. Pumping means in cooperative relationship with the lasing material is effective in exciting the atoms thereof to an inverted population density: i.e., most of the atoms of the lasing material are raised from a normally-occupied lower energy level to a higher metastable energy level in response to excitation thereof by the pumping means. Given enough time, an excited atom of the lasing material will naturally drop back from its higher metastable energy level to its normally-occupied energy level. In so doing, a photon of electromagnetic energy having a predetermined frequency which is proportional to the difference in the two energy levels is emitted.

However, in addition to such natural drop-back, an excited atom of the lasing material may be stimulated by interaction therewith of a photon having the aforesaid predetermined frequency, which is already present in the lasing material. The stimulated atom drops back from its metastable higher energy level to its normally-occupied lower energy level, thereby emitting another photon of the same predetermined frequency in phase with the originally present photon. Such interaction between an excited atom of the lasing material and an already present photon takes place in any given case with a certain probability. The probability of interaction between a photon and an excited atom of lasing material may be significantly increased by preventing a photon of the aforesaid predetermined frequency produced in the lasing material from readily escaping therefrom. This may be accomplished by providing individual first and second reflective surfaces in cooperative relationship with the respective opposite ends of the lasing material for reflecting photons of this predetermined frequency back and forth therebetween through the lasing material. If more photons of this predetermined frequency are, on the average, produced by stimulated emission during one pass of the stimulating photons between the reflective surfaces through the lasing material than the number of photons which escape therefrom, a regenerative chain reaction will take place and a beam of coherent radiation at the predetermined frequency will be formed.

A useful output may be taken from the laser by such means as making one of the reflective surfaces only partially reflective, for instance.

There are two types of lasers, namely, those that operate to produce an output continuously and those that are operated to produce a pulsed output. This invention is concerned with the latter type of laser.

In pulsed-output lasers, it is desired to intermittently produce a single high-amplitude pulse of coherent radiation. However, it has been found that many lasing materials employed in pulsed-output lasers tend to produce a series of low-amplitude pulses, rather than the desired single high-amplitude pulse. The reason for this is that the lasing material begins to produce a coherent beam of radiation by stimulated emission before the inverted population density of the atoms of the lasing material has time to reach a very high value.

In order to prevent a coherent beam of radiation from being produced in a pulsed-output laser until sufficient time has elapsed for the inverted population density of the atoms of the lasing material to reach a very high value, so that the desired single high-amplitude pulse of coherent radiation is produced, rather than an undesired series of low-amplitude pulses, it has been the practice to insert a Q-switch between one of the reflective surfaces and the lasing material. The Q-switch, in the first condition thereof, lowers the effective gain of the laser to a point below unity, so that the above-described regenerative chain reaction does not take place. Therefore, by maintaining the Q-switch in its first condition for a time interval sufficient for the inverted population density to reach a very high value, and then switching the Q-switch to a second condition thereof which effectively disconnects the Q-switch and permits the gain of the laser to rise above unity, the above-described regenerative chain reaction takes place and a single high-amplitude pulse of coherent radiation, rather than a series of low-amplitude pulses, is produced.

One well known type of Q-switch is a saturable absorber which operates as an optical absorption filter at the lasing frequency only when unsaturated. More particularly, a saturable absorber may be composed of a liquid or solid solution of an organic dye or may be gaseous in form. In any case the saturable absorber, when unsaturated, absorbs a sufficient number of photons impinging thereon to maintain the gain of the laser below unity. This is accomplished by adjusting the concentration of saturable absorber and the effective length thereof so that a certain percentage of light, typically fifty percent, at the predetermined operating frequency of the laser is absorbed so long as the saturable absorber remains unsaturated. This permits the inverted population density of the atoms of the lasing material to reach a maximum.

However, the very act of absorbing photons causes the saturable absorber to ultimately become saturated, at which time the optical absorption filter becomes relatively transparent, permitting the gain of the laser to rise to a point above unity. This results in the production of a single pulse of coherent radiation at the predetermined frequency of the laser.

In the past, a Q-switch laser device using a saturable absorber has consisted of a plurality of individual separate elements, namely, a rod of lasing material, such as ruby, for instance; an appropriate cell with quartz windows which are set at Brewster's angle, which cell contains the saturable absorber material; and one or two external mirrors. All of these separate elements are mounted on a heavy rigid base to provide the high degree of dimensional stability among these elements which is required to satisfactorily operate the laser. In addition, of course, the lasing material must be pumped by pumping means, such as a flash tube or a CW light source surrounding the lasing material, or otherwise optically coupled to the lasing material.

The above-described conventional Q-switch laser device arrangement has several disadvantages. First, the insertion of Brewster windows made of a material with a refractive index greater than unity displaces the light beam parallel to itself, and therefore requires a re-alignment of the optical resonant cavity. Second, the insertion of the saturable absorber cell with its four window faces introduce additional scatter losses and sometimes additional absorption losses. Third, the window material is vulnerable to the enormous field density produced by Q-switch pulses and is easily ruined by them. Fourth, the insertion of an additional optical element with its own mechanical instability introduces optical noise in the laser output. Fifth, the insertion of a saturable absorber cell with its four window faces, each with its small unavoidable reflectivity, changes the optical resonant cavity from a two-reflector to a six-reflector cavity, thereby spoiling the simple longitudinal and transversal field and modes distribution. Sixth, the insertion of a cell at Brewster's angle causes the beam to become linearly polarized, which in some cases is objectionable. Seventh, and most important, the whole device from one reflector to another is bulky, subject to mechanical instability and difficult to align.

It is therefore an object of the present invention to provide a Q-switch laser device in the form of a single unitary structure which obviates all of the seven above-mentioned disadvantages of conventional Q-switched lasers using saturable absorbers.

This and other objects, features and advantages of the present invention will become more apparent from the following detailed description taken together with the accompanying drawing in which the sole figure shows a preferred embodiment of the present invention.

Referring now to the drawing, a length of solid lasing material in the form of lasing rod 100 is oriented in co-linear serial relationship with tubular enclosure 102, which may be composed of metal, quartz or glass. One end 104 of tubular enclosure 102 encompasses one end 106 of lasing rod 100 and is attached thereto by a suitable wax or epoxy cement 108. The other end 110 of tubular enclosure 102 is sealed by flat mirror 112, as shown. Tubular enclosure 102 is filled with a saturable absorber 114, which, as mentioned above, may be gas or a liquid or solid solution which is effective, when unsaturated, in absorbing the operating frequency of the laser, which is determined by the material of which lasing rod 100 is composed. Saturable absorber 114 is admitted into tubular enclosure 102 through inlet 116 which is then pinched off.

The other end 118 of lasing rod 100 is polished with a radius slightly larger than the combined length of lasing rod 100 and tubular enclosure 102 and is coated for high reflectivity to provide spherical mirror surface 120 at other end 118 of lasing rod 100.

As shown, one end 106 of lasing rod 100 interfaces with one end of the length of saturable absorber 114. In order to minimize light reflection at this interface, one end 106 of lasing rod 118 is provided with anti-reflection coating 122, as shown.

Rough alignment between reflective surface of spherical mirror surface 120 and the surface of flat mirror 112 is accomplished by accurate machining and assembling of the parts. Fine alignment is provided by a slight correcting pinch 124 of tubular enclosure 102, as shown.

It will be seen that spherical mirror 120, lasing rod 100, tubular enclosure 102 and flat mirror 112, attached as shown, form a single unitary structure 126.

The whole unit 126 may be inserted in a conventional optical pumping cavity (not shown), with the pumping light source focused on lasing rod 100. If tubular enclosure 102 is composed of glass or quartz, it may be made opaque to prevent possible bleaching of saturable absorber 114 by ultraviolet pumping radiation.

The unitary structure 126 provides a Q-switch laser device utilizing a saturable absorber which eliminates all of the above-mentioned disadvantages of conventional devices of this type. Furthermore, the unitary structure 126 does away with any external mirror set-up, is mechanically stable, and is totally pre-aligned.

What is claimed is:
1. A Q-switch laser unitary structure comprising a longitudinal substantially rigid solid rod of lasing material capable of lasing at a given frequency, said rod being terminated at one end thereof in a plane surface which is substantially normal to the length thereof and being terminated at the other end thereof in a mirror surface, a longitudinal substantially rigid tubular enclosure having one end thereof encompassingly in contact with and rigidly bonded to the entire periphery of said rod solely in proximity to said one end of said rod, said rod and said enclosure having their respective lengths oriented in co-linear serial relationship, a flat second mirror oriented substantially normal to the length of said enclosure and fixedly sealed to and covering the entire other end of said enclosure, whereby said enclosure, said one end of said rod and said flat mirror define a closed container, a saturable absorber material filling said container, which material is used to Q-switch said lasing material, and said mirror surface and said flat mirror being aligned with respect to each other to define a resonant cavity for said laser structure at said given frequency.

2. The structure defined in claim 1, wherein said enclosure includes a corrective pinch placed there for fine alignment of said mirror surface and said flat mirror 3. The structure defined in claim 1, wherein said one end of said rod is covered with an anti-reflection coating to decrease reflection losses at the interface of said one end and said saturable absorber.

References Cited

UNITED STATES PATENTS

| 3,270,291 | 8/1966 | Kosonocky | 331—94.5 |
| 3,295,911 | 1/1967 | Ashkin et al. | 331—94.5 X |
| 3,311,845 | 3/1967 | Koester | 331—94.5 |
| 3,355,675 | 11/1967 | Varsanyi | 331—94.5 |
| 3,379,997 | 4/1968 | Melhart | 331—94.5 |
| 3,390,351 | 6/1968 | Bell | 331—94.5 |
| 3,409,819 | 11/1968 | Soffer | 331—94.5 X |

OTHER REFERENCES

"A Compact Pulsed Gas Laser for the Far Infrared," Large et al., Applied Optics, 4 (5), May 1965, p. 625.

RONALD L. WIBERTA, Primary Examiner

R. J. WEBSTER, Assistant Examiner